3,589,963
METHOD FOR PREPARING BUILDING BOARDS HAVING ATTACHED ONTO THEIR BASES VENEER STRIPS STANDING ON THEIR NARROW EDGE AND ATTACHED TO EACH OTHER
Olav Nordgren Jensen, Kotka, Finland, assignor to O. Y. Gutzeitin Laatikkotehdas-A.B. Gutzeits Ladfabrik, Kotka, Finland
No Drawing. Filed Sept. 21, 1967, Ser. No. 669,403
Claims priority, application Finland, Oct. 28, 1966, 2,848/66
Int. Cl. B32b 21/14
U.S. Cl. 156—264            4 Claims

ABSTRACT OF THE DISCLOSURE

The subject of this invention is a method for manufacturing building boards in which the surface layer is made of veneer strips standing on their narrow edge and being secured to each other and to the base and in which board the fiber direction of the veneer strips is parallel with the base. The method of manufacture comprises joining together wood veneers manufactured in a conventional manner so that the fiber direction of the veneers will be parallel to the longitudinal axis of the desired final product. The veneers so joined together are, by gluing and pressing, converted into a composite board with the fibers in each layer of the composite board produced lying in parallel alignment after which the composite board is sawn into staves in one or more steps the width of the staves being about twice the thickness of the surface layer of the final product, the staves are then turned for 90 degrees so that the transverse, horizontal thickness of the single veneer strips in the staves is their smallest dimension, and are assembled together to form a core board. The orientation of the veneers is uniform throughout the core board. A base board is attached to each side of said core board so that the narrowest faces of the veneer strips in the staves engage the base board and the thick board comprising the core board and base boards, either as such or after sawing it into more narrow boards, is cut through the core board into two thinner building boards, a surface layer of each of which consists of veneer strips standing on their narrowest faces, whereupon said surface layer is ground and surface treated in a desired manner.

BACKGROUND OF THE INVENTION

Field of the invention

This invention relates to a method for manufacturing building boards such as floor, wall or ceiling boards of unlimited length, wherein veneer strips standing on their narrowest faces and secured to each other are attached onto a suitable base. The object of the invention is to provide a method of manufacture which is very economic and by which it is possible to manufacture building boards of any desired width and length. The length and width are, of course, limited by the potential awkwardness of handling at the building site, but theoretically boards of any length and width can be manufactured by the method according to the invention.

Description of the prior art

It has been suggested in the past to manufacture boards of the above-mentioned character in the manner the common so called stave boards are manufactured, the topmost veneer, consisting e.g. of rejected veneer, being, however, subsequently removed by planing or by grinding, so as to expose the veneer strips standing on edge as a smooth surface. The boards have been manufactured as well without the above-mentioned top veneer, but handling difficulties have then been encountered in the various manufacturing steps.

SUMMARY OF THE INVENTION

A method for manufacturing building boards having veneer strips standing side by side with their narrowest faces attached to a base the strips also being attached to each other, characterized in that wood veneers manufactured in a conventional manner are joined together so that the fiber direction of the veneer strip is parallel to the longitudinal axis of the desired final product. The veneers joined as described are, by gluing and pressing, converted into a composite board with the fibers of each of the layers parallel, after which the resulting composite board is sawn into staves in one or more steps the width of said staves being about twice the thickness of the surface layer of the final product. The staves are then turned through 90 degrees and assembled together to form a core board of staves attached side by side to each other with their fibers aligned in the longitudinal direction. A base board is attached to each side of the said core board, and the resulting thick board, either as such or after sawing it into narrower boards, is cut through the core board along a plane generally parallel to the board surfaces into two thinner building boards, one surface layer of each of which consists of veneer strips standing on their narrowest faces, whereupon said surface layer is ground and surface treated in a desired manner.

DESCRIPTION OF THE PREFERRED EMBODIMENT

The invention is described in the following in conjunction with the manufacture of floor boards consisting of birch veneer, but it is to be understood that the method is equally adaptable to the manufacture of boards consisting of other wood species and that the base can consist of other material than plywood, e.g. of hard fibre board, particle board, stave board etc.

Veneers of normal size and about 2 mm. thick are joined together preferably by beveling the ends to be joined and by gluing them together in a manner known per se, to form veneers of suitable length, e.g. up to 5 metres, which has proved advantageous in the case of manufacturing floor boards. From 12 to 14 pieces of such long veneers are stacked upon each other, and at this stage glue is applied to each side of every second veneer, preferably utilizing a water resistant glue. Such a multiple veneer stack is thereafter pressed in a manner known per se to form a board. The edges of this board are trimmed and it is sawn into boards about 30 cms. width. These boards are further sawn by means of a multiple saw into staves 20 to 28 mms. height and 18 mms. width. The staves are thereafter introduced to an assembling machine, where they are assembled to form a so called core board wherein the individual veneer strips are attached side by side with their narrowest faces forming the broad surfaces of the composite core board.

Onto both sides of the core board are then attached, by gluing and pressing, plywood boards about half the thickness of the core board, the fibre direction of the plywood veneer adjacent the core board preferably being at right angles to that of the veneer strips. The thick board thus produced, about 120 cms. wide and about 500 cms. long, is thereafter sawn in to boards about 20 cms. wide, the thickness of which will be about 36 mms. These boards are thereafter sawn in two parts through the core boards in a plane lying generally parallel to the board surfaces, yielding each time two boards about 500 cms. long, about 20 cms. width and about 18 mms. thickness. Thus are obtained two unfinished boards, a surface layer of each of which consists of birch veneer strips standing on their narrowest faces, i.e. the faces of least surface area and attached to the base and to each other. This surface of the cut core board is ground and surface treated in a desired manner, e.g. with varnish. The boards can, if desired, further be provided with tongues and grooves.

It is particularly to be noted that since the joining of the veneer is effected by beveling the ends of the veneers, and if the joined veneers further are arranged by staggering the joints so that the joining points of adjacent veneers will not occur side by side, a final product is obtained wherein the joints are quite unnoticeable and in addition so tight that dust and other dirt will not collect therein.

Another advantage of the above-described method is achieved in that, as the staves at the assembling stage of the core board are turned for 90 degrees, the pressure plane in the layer of the veneers constituting the wearing surface of the finished product will be vertical, having the advantageous results that, since the wood is somewhat compressed during the pressure stage, the wood will slowly revert with time almost to its original thickness, thus automatically tightening the seams between adjacent boards in a finished floor, wall, or ceiling .

Also, when water resistant hard resin glues are utilized, the glue penetrates the wood cells, thus constituting a kind of rot protection, while the hardness of the floor is improved by virtue of the glue joints being situated near each other.

The veneers can, of course, be patched at knot sites if so desired, but alternatively the knots can be left in place, in which case the surface, e.g. of a floor, is enlivened by darker thin knot sites occurring here and there in the veneers.

What I claim is:

1. A method for manufacturing building boards having veneer strips standing side by side with their narrowest faces attached to a base, the strips also being attached to each other, comprising manufacturing wood veneers in a conventional manner; joining said veneers together with beveled joints while keeping the fiber direction of the veneer parallel to the longitudinal axis of the final product, sticking and gluing the joined veneers to form a composite board having a plurality of layers with the fibers in all of the layers parallel, sawing said composite board in at least one sawing step in to staves, the width of said staves being about twice the thickness of a surface layer of the final product, turning said staves through an angle of 90 degrees and assembling the staves together to form a core board where in the orientation of the veneers with respect to the fiber direction is uniform from one surface of the finished core board to the other surface of the same, then securing a base board to each side of said core board to produce a relatively thick board, cutting said relatively thick board through the core board in a plane generally parallel to the core board surfaces and to the fiber direction to produce two building boards, so that a surface layer of each of said two building board consists of veneer strips standing on their narrowest faces, and finally grinding and treating said surface layer.

2. The method of claim 1 including joining together the veneers prepared and cut in a conventional manner with beveled joints and arranging joining points of the veneers in the composite board so that the joining points in two adjacent veneers will not occur side by side.

3. The method of claim 1 wherein the base boards consist of plywood and including orienting the base boards so that the direction of the fibers in the plywood of the base boards is transversal to the fiber direction of the surface layer.

4. The method of claim 1 wherein each base board consists of the same species of wood as the surface layer the thickness of said base boards being at least approximately equal to that of its surface layer.

References Cited

UNITED STATES PATENTS

| | | | |
|---|---|---|---|
| 1,805,179 | 5/1931 | Loetcher | 156—301 |
| 2,751,946 | 6/1956 | Gramelspacher | 156—264 |
| 2,991,214 | 7/1961 | Burkholder | 156—301 |
| 3,224,919 | 12/1965 | Elmendorf | 156—299 |
| 1,594,889 | 8/1926 | Loetscher | 156—254 |
| 2,062,175 | 11/1936 | Hartman | 144—309 |
| 2,062,590 | 12/1936 | Lundquist | 41—23 |
| 2,101,906 | 12/1937 | Hopkinson | 156—254 |
| 2,197,032 | 4/1940 | Dickey | 156—228 |
| 2,569,831 | 10/1951 | Ryall | 156—254 |
| 3,003,205 | 10/1961 | Frashour et al. | 156—254 |
| 3,041,231 | 6/1962 | Fountain | 156—254 |
| 3,445,325 | 5/1969 | Clark | 161—166 |

CARL D. QUARFORTH, Primary Examiner

B. H. HUNT, Assistant Examiner

U.S. Cl. X.R.

156—254, 260, 299, 301; 144—314A, 315R, 316